United States Patent [19]

Purcell

[11] Patent Number: 5,144,303
[45] Date of Patent: Sep. 1, 1992

[54] STACKED COMPUTER KEYBOARD FUNCTION KEY MULTIPLE TEMPLATE RETAINERS

[76] Inventor: Ronald W. Purcell, 500 Hidden Valley Rd., Grants Pass, Oreg. 97527

[21] Appl. No.: 584,754

[22] Filed: Sep. 19, 1990

[51] Int. Cl.⁵ .................. H03M 11/00; B42F 17/00
[52] U.S. Cl. .................................. 341/23; 40/390; 40/534
[58] Field of Search .............. 341/22, 23; 40/380, 40/390, 395, 388, 644, 534; 340/711, 712; 364/709.1, 709.12, 189; D14/114; D19/75, 76; 412/901; 402/501, 26, 27, 29, 68; 16/DIG. 13

[56] References Cited

U.S. PATENT DOCUMENTS

| | | | |
|---|---|---|---|
| 1,156,160 | 10/1915 | Lewis | 402/501 |
| 2,042,672 | 6/1936 | MacLean | 40/534 |
| 2,204,098 | 6/1940 | Ainsworth | 40/534 |
| 2,742,261 | 1/1939 | Ainsworth | 40/534 |
| 3,394,368 | 7/1968 | Carr et al. | 341/23 |
| 3,560,964 | 2/1971 | Bedell et al. | 341/23 |
| 4,326,193 | 4/1982 | Markley et al. | 340/711 |
| 4,441,001 | 4/1984 | Miyano et al. | 311/23 |
| 4,636,065 | 1/1987 | Kanemitsu et al. | 16/DIG. 13 |
| 4,823,311 | 4/1984 | Hunter et al. | 364/709.14 |
| 4,864,755 | 9/1989 | Owens | 40/644 |
| 4,878,055 | 10/1989 | Rasahara | 341/23 |
| 4,935,888 | 6/1990 | Heston et al. | 364/709.1 |

*Primary Examiner*—Donald J. Yusko
*Assistant Examiner*—R. Gray
*Attorney, Agent, or Firm*—Fleit, Jacobson, Cohn, Price, Holman & Stern

[57] ABSTRACT

A plurality of elongated flexible strips are provided including opposite longitudinal margins. One set of corresponding margins of the strips are secured together in registered superposed relation and to the rear surface of a computer keyboard and an equal number of function key templates or indentity strips are secured to the other set of corresponding margins of flexible strips in a similar manner by adhesive coatings. The flexible strips support the function key templates or identity strips for swinging movement between superposed positions closely juxtaposed with the function keys of the computer keyboard and out of the way positions disposed behind the rear surface of the computer keyboard.

11 Claims, 1 Drawing Sheet

STACKED COMPUTER KEYBOARD FUNCTION KEY MULTIPLE TEMPLATE RETAINERS

BACKGROUND OF THE INVENTION

1. FIELD OF THE INVENTION

This invention relates to an organizer and support structure for multiple computer keyboard function key templates whereby multiple templates may be supported from a computer keyboard in an organized manner and selectively moved into operational registry with the function keys of the computer keyboard.

2. DESCRIPTION OF RELATED ART

Various different forms of keyboard template supports as well as other structures including some of the general concept features of the instant invention heretofore have been provided. Examples of these previously known structures are disclosed in U.S. Pat. Nos. 2,042,672, 2,142,261, 2,204,098 3,394,368, 3,560,964, 4,326,193, 4,441,001, 4,823,311, 4,864,755 and 4,878,055. However, these previously known structures do not include the improvement aspects of the instant invention which enable multiple templates to be supported from present day computer keyboards in an organized manner such that any selected template of the supported templates may be conveniently moved into operative close registry with the function keys of the associated keyboard.

SUMMARY OF THE INVENTION

The template retainers of the instant invention comprise flexible strips which may be generally 305 mm in length and generally 57 mm in width. In addition, the strips may be generally 0.025 mm in thickness and constructed of polyester film. The strips are therefore relatively flexible and extremely durable. The opposite longitudinal margins of the strips are provided with contact adhesive coatings. One set of coatings secures the strips to a rear portion of an associated keyboard in superposed relation, and the other set of adhesive coatings secures corresponding longitudinal margins of associated function key template strips to the plastic strips. In this manner, the function key templates or strips are hingedly supported from the keyboard in a manner such that any selected template may be swung into and retained in operative juxtaposition with the function keys of the keyboard.

The main object of this invention is to provide a structure by which multiple function key templates may be supported from a computer keyboard in an organized manner and further in a manner enabling a selected template to be shifted into operative juxtaposition with the function keys of the keyboard.

A second key object of this invention is to prevent function key templates from moving out of alignment with associated function keys while in use.

Another object of this invention is to provide a function key strip or template organizer in accordance with the preceding objects and which may used in conjunction with substantially all present day computer keyboards.

Still another object of this invention is to provide an organizer having operating characteristics such that older discontinued use function key strips may be replaced by upgraded function strips.

A further object of this invention is to provide an organizer that will enable any set of organized templates to be removed from one keyboard and remounted upon another keyboard.

Another object of this invention is to provide an organizer for function key templates or identity strips which will allow additional templates or strips to be added thereto.

A final object of this invention to be specifically enumerated herein is to provide an apparatus in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
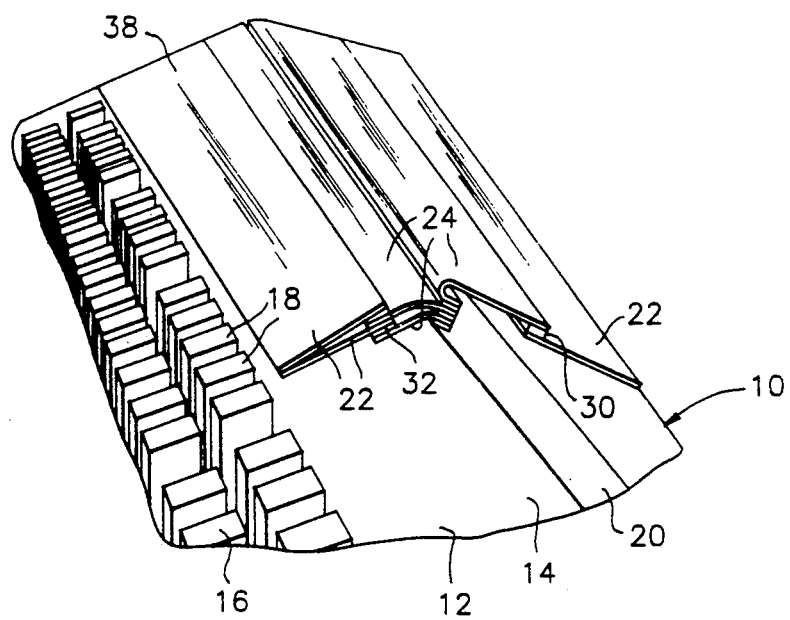
FIG. 1 is a fragmentary perspective view of the left rear area of a typical form of computer keyboard illustrating the organizer of the instant invention operatively associated with the keyboard and supporting three function key strips or templates therefrom for selective, operative close juxtaposition with the function keys of the keyboard.

Referring now more specifically to the drawings the numeral 10 generally designates a conventional form of computer keyboard including a rearwardly and upwardly inclined, upwardly facing upper or rear surface 12 including an upper margin 14 below which horizontal transverse rows 16 and 18 of keys project. The upper row of keys 18 comprise function keys and the upper or rear margin 14 terminates rearwardly in a downwardly extending rear surface 20.

According to the program the attendant computer (not shown) is programmed for, a function key strip or template 22 usually is placed upon the upper margin 14 in close juxtaposition to the function keys 18 to thereby identify the function of each of the function keys 18. Accordingly, when the program of the attendant computer is changed, a different function key strip or template 22 must be placed upon the upper margin 14 in operative close juxtaposition with the function keys 18.

Inasmuch as an individual keyboard and the attendant computer may be programmed to function in conjunction with numerous computer programs, numerous function key strips or templates 22 may be used in conjunction with the keyboard 10 in a single working day.

Accordingly, &here. is a need for structure by which numerous function key templates or strips may be supported from the keyboard 10 in an organized manner and in a manner which will enable any one of the numerous supported function key strips or templates to be rapidly positioned and supported in operative close juxtaposition with the function keys.

Figure 3:
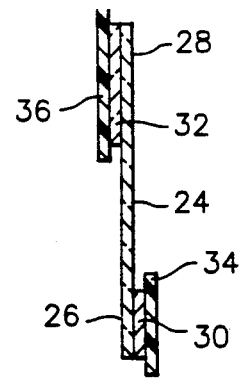
FIG. 3 is an enlarged transverse sectional view of a first form of organizer strip.

A first form of function key strip or template organizer or retainer constructed in accordance with the present invention is referred to by the reference numeral 24 and comprises a flexible plastic strip of generally 305 mm in length, generally 57 mm in width and generally 0.025 mm in thickness. Each of the strips 24 includes first and second longitudinal margins 26 and 28 and the margins 26 and 28 have contact adhesive layers or strips 30 and 32 thereon covered by protective wax paper release strips 34 and 36, see FIG. 3.

Figure 2:
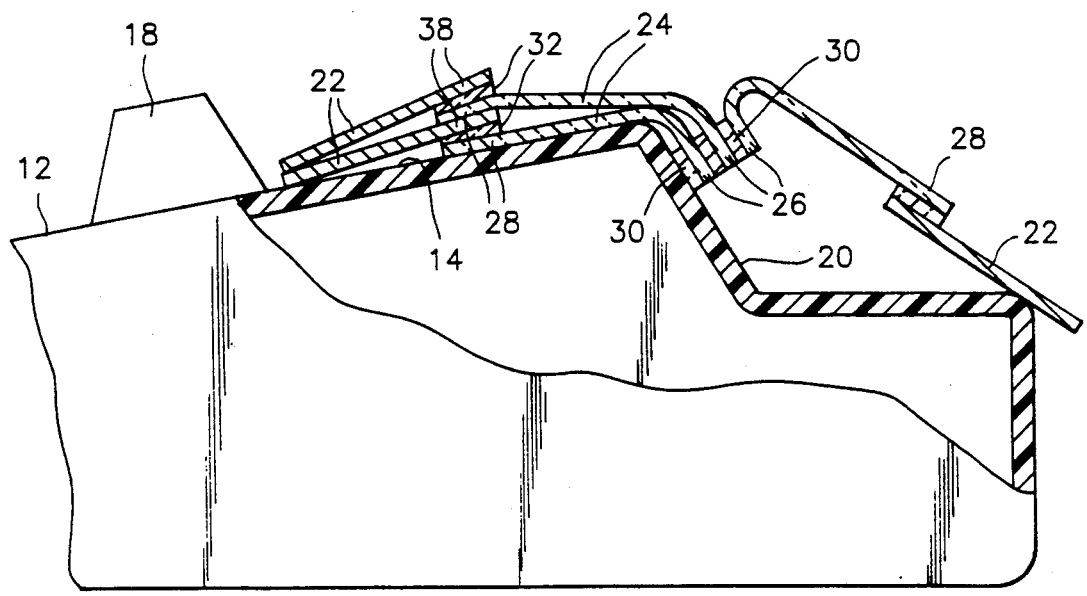
FIG. 2 is a fragmentary enlarged, right side elevational view of the computer keyboard with portions of the keyboard, the function key templates and the organizer being broken away and illustrated in vertical section, the thicknesses of the function key templates and the organizer strips as well as the connecting and mounting contact adhesive layers or coatings being exaggerated for clarity purposes.

FIGS. 1 and 2 of the drawings illustrate as an example three strips 24 utilized to support three templates or strips 22 from the keyboard 10. Initially, the contact adhesive layers or strips 32 are used to secure the rear margins 38 of the templates or strips 22 to the second margins 28 of the strips 24. Then, after the templates 22 have been positioned in superposed relation over the upper margin 14 in close operative juxtaposition with the function keys 18, the first margins 26 of the strips 24 are secured to the rear surface 20 of the keyboard 10 in superposed relation such as that illustrated in FIG. 2 of the drawings. Thereafter, the desired template or strip 22 may be moved into operative juxtaposition with the function keys 18 in a manner which is believed obvious from FIGS. 1 and 2 of the drawings. Any function key template or strip 22 which is not positioned in overlying relation to the upper margin 14 is allowed to hang behind the rear surface 20 of the keyboard 10 in the manner best shown in FIG. 2.

Figure 4:
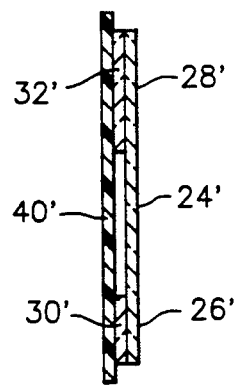
FIG. 4 is an enlarged transverse sectional view of a second form of organizer strip.

With reference now more specifically to FIG. 4, FIG. 4 illustrates a second form of strip 24' including first and second margins 26' and 28' having contact adhesive layers or strips 30' and 32' thereon covered by a single wax paper release strip 40. The margins 26 and 28 of the strips 24 have the contact adhesive layers or strips 30 and 32 on opposite sides of the strip 24, whereas the contact adhesive layers or strips 30' and 32' of the strip 24' are disposed on the same side of the strip 24'.

If the strips 24' are used in lieu of the strips 24 illustrated in FIG. 2, the only difference would be that the second margins 28' of the strips 24' would be disposed on top of the rear margins 38 of the templates or strips 22 overlying the upper margin 14. Otherwise, the strips 24 and 24' function in substantially the same manner.

Further, this invention may be used in conjunction with a certain common older style of function key templates which align with function keys arranged in columns at one side of the keyboard, as opposed to the more contemporary function key arrangement shown in FIGS. 1 and 2.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination component keyboard of the type including an upwardly facing surface above which input data keys project including an upper row of function keys spaced forward of a rear margin of said surface, said rear margin terminating rearwardly in a downwardly extending rear surface, a plurality of elongated, stiff function key template strips for selective positioning across said rear margin forward of the rear extremity thereof with each strip including front and rear longitudinal margins, a plurality of elongated strips of flexible material each having first and second longitudinal margins, first means stationarily securing said first margins to said rear surface in superposed and substantially registered relation, second means stationarily securing said second margins to said rear longitudinal margins, the width of said flexible material strips between said first and second margins thereof being sufficient to support said stiff template strips in superposed generally registered positions from said rear margin in close juxtaposition with said upper row of function keys, said flexible material strips being smoothly reversibly bendable adjacent and along said first margins and operable to swing the corresponding stiff template strips upwardly and rearwardly away from said upwardly facing surface and downwardly over said rear surface into generally superposed, inverted registered positions, spaced below said first margins.

2. The combination of claim 1 wherein said strips of flexible material are transparent.

3. The combination of claim 1 wherein said strips of flexible material are constructed of polyester film of generally 0.025 mm thickness.

4. The combination of claim 1 wherein said first means includes a strip of contact adhesive carried by said first margins.

5. The combination of claim 1 wherein said second means includes a strip of contact adhesive carried by said second margins.

6. The combination of claim 5 wherein said first means includes a strip of contact adhesive carried by said first margins.

7. The combination of claim 6 wherein said strips of contact adhesive on each flexible material strip are carried by the same side thereof.

8. The combination of claim 6 wherein said strips of contact adhesive on each flexible material strip are carried by opposite sides thereof.

9. The combination of claim 8 wherein said strips of flexible material are constructed of polyester film of generally 0.025 mm thickness.

10. The combination of claim 9 wherein said strips of flexible material are transparent.

11. In combination, an electronic component keyboard of the type including an upwardly facing surface above which input data keys project including an upper row of function keys spaced forward of a rear margin of said surface, a plurality of elongated, stiff function key template strips for selective positioning across said rear margin forward of the rear extremity thereof with each strip including front and rear longitudinal margins, a plurality of elongated strips of flexible material each having first and second longitudinal margins, first means stationarily securing said first margins to said keyboard rearward of said rear margin against shifting relative thereto and in superpose and substantially registered relation, second means stationarily securing said second margins to said rear longitudinal margins against shifting relative thereto, the width of said flexible material strips between said first and second margins thereof being sufficient to support said stiff template strips in superposed generally registered positions from said rear margin in close juxtaposition with said upper row of function keys, said flexible material strips being smoothly reversibly bendable adjacent and along said first margins and operable to swing the corresponding stiff template strips upwardly and rearwardly away from said upwardly facing surface and downwardly to the rear of said rear margin into generally superposed, inverted registered positions, spaced below said first margins.

* * * * *